US012596012B2

(12) United States Patent
Cai

(10) Patent No.: US 12,596,012 B2
(45) Date of Patent: Apr. 7, 2026

(54) METHOD FOR DETERMINING POINT OF INTEREST FOR USER, ELECTRONIC DEVICE AND STORAGE MEDIUM

(71) Applicant: Nanjing Horizon Information Technology Co., Ltd., Nanjing (CN)

(72) Inventor: Rui Cai, Nanjing (CN)

(73) Assignee: Nanjing Horizon Information Technology Co., Ltd., Nanjing (CN)

( * ) Notice: Subject to any disclaimer, the term of this patent is extended or adjusted under 35 U.S.C. 154(b) by 8 days.

(21) Appl. No.: 18/782,567

(22) Filed: Jul. 24, 2024

(65) Prior Publication Data

US 2025/0035461 A1     Jan. 30, 2025

(30) Foreign Application Priority Data

Jul. 25, 2023    (CN) .......................... 202310925643.6

(51) Int. Cl.
*G01C 21/00*      (2006.01)
*G01C 21/36*      (2006.01)

(52) U.S. Cl.
CPC ..... *G01C 21/3679* (2013.01); *G01C 21/3664* (2013.01)

(58) Field of Classification Search
CPC ............ G01C 21/3679; G01C 21/3664; G06F 16/24575; G06F 16/24578; G06F 16/9537;
(Continued)

(56) References Cited

U.S. PATENT DOCUMENTS

| | | | |
|---|---|---|---|
| 6,401,034 B1 * | 6/2002 | Kaplan .............. | G01C 21/3682 340/988 |
| 8,090,528 B2 * | 1/2012 | Chiba ................ | G01C 21/3682 701/454 |

(Continued)

FOREIGN PATENT DOCUMENTS

| | | |
|---|---|---|
| CN | 110998563 A | 4/2020 |
| CN | 115712785 A | 2/2023 |
| KR | 20160016266 A | 2/2016 |

OTHER PUBLICATIONS

Extended European Search Report from corresponding European Patent Application No. 24190643.7, mailed on Dec. 9, 2024.
(Continued)

*Primary Examiner* — Masud Ahmed
(74) *Attorney, Agent, or Firm* — K&L Gates LLP

(57)     ABSTRACT

A method for determining a point of interest for a user includes: in response to receiving a point of interest query instruction of a user, determining point of interest classification information about points of interest to be queried based on the point of interest query instruction; acquiring body state information about a user, vehicle state information about a vehicle carrying the user, and surrounding environment information about a pre-set range around the vehicle; determining a set of candidate points of interest based on the information; determining scores respectively corresponding to each of the candidate points of interest in the set of candidate points of interest based on the body state information about the user, vehicle state information and a pre-set scoring rule; and determining a target point of interest corresponding to the point of interest query instruction based on scores respectively corresponding to each of the candidate points of interest.

18 Claims, 8 Drawing Sheets

(58) Field of Classification Search
 CPC ..... G06F 18/24; G06F 16/9535; G06V 40/18;
 G06V 40/20
 See application file for complete search history.

(56) References Cited

U.S. PATENT DOCUMENTS

| | | | |
|---|---|---|---|
| 8,818,716 B1 | 8/2014 | El Dokor et al. | |
| 2002/0138196 A1* | 9/2002 | Polidi | G01C 21/3682 |
| | | | 340/995.1 |
| 2010/0332324 A1* | 12/2010 | Khosravy | G06Q 30/00 |
| | | | 707/769 |
| 2013/0050258 A1 | 2/2013 | Liu et al. | |
| 2014/0278068 A1* | 9/2014 | El Dokor | G06F 3/017 |
| | | | 701/461 |
| 2019/0050645 A1 | 2/2019 | Hentz et al. | |

OTHER PUBLICATIONS

First Chinese office action from corresponding Chinese patent application No. 2023109256436, mailed on Jul. 29, 2025 and its English translation.

\* cited by examiner

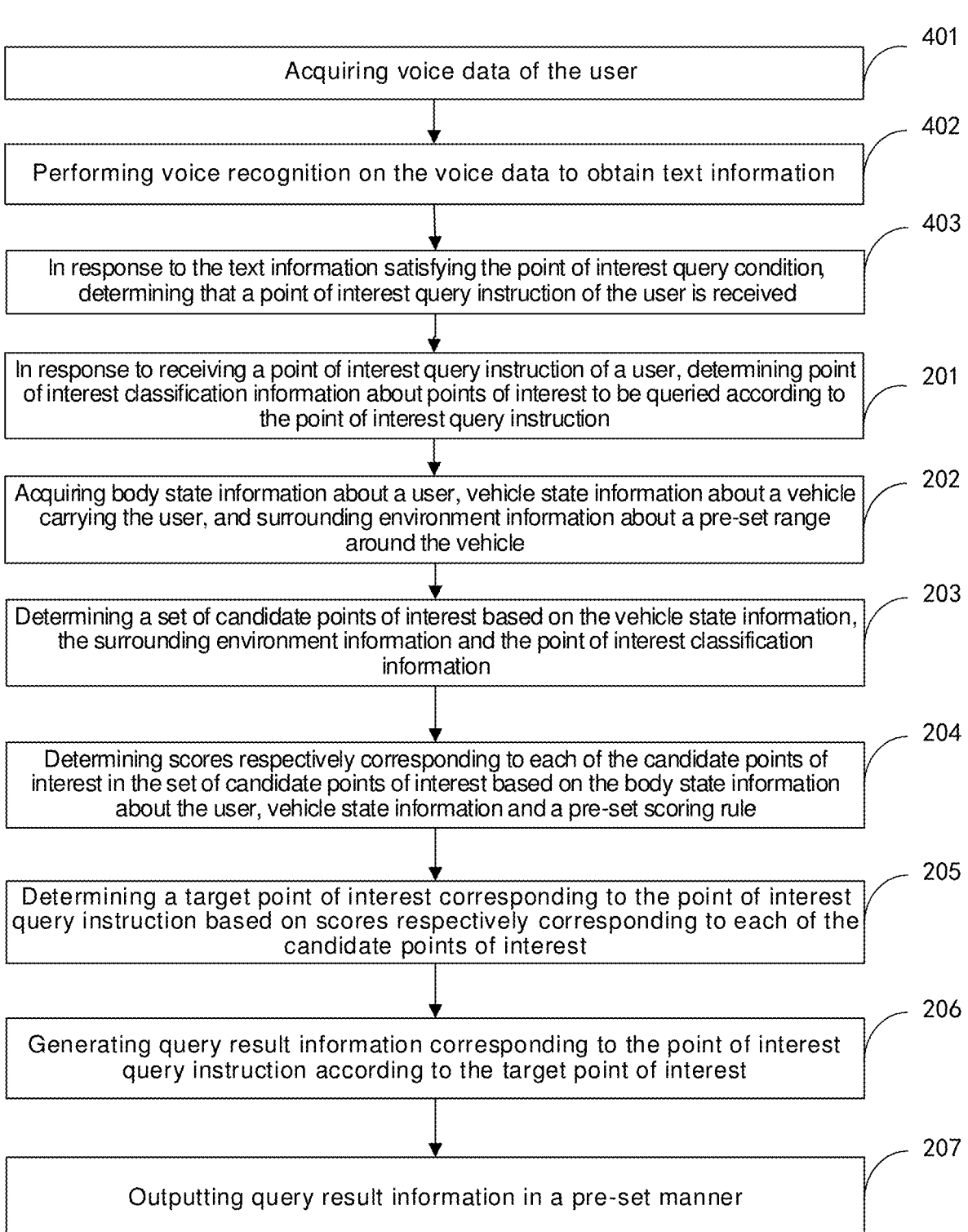

401
Acquiring voice data of the user

402
Performing voice recognition on the voice data to obtain text information

403
In response to the text information satisfying the point of interest query condition, determining that a point of interest query instruction of the user is received 201
In response to receiving a point of interest query instruction of a user, determining point of interest classification information about points of interest to be queried according to the point of interest query instruction 202
Acquiring body state information about a user, vehicle state information about a vehicle carrying the user, and surrounding environment information about a pre-set range around the vehicle 203
Determining a set of candidate points of interest based on the vehicle state information, the surrounding environment information and the point of interest classification information 204
Determining scores respectively corresponding to each of the candidate points of interest in the set of candidate points of interest based on the body state information about the user, vehicle state information and a pre-set scoring rule 205
Determining a target point of interest corresponding to the point of interest query instruction based on scores respectively corresponding to each of the candidate points of interest 206
Generating query result information corresponding to the point of interest query instruction according to the target point of interest 207
Outputting query result information in a pre-set manner

FIG. 6

METHOD FOR DETERMINING POINT OF INTEREST FOR USER, ELECTRONIC DEVICE AND STORAGE MEDIUM

CROSS-REFERENCE TO RELATED APPLICATION

This patent application claims the priority and benefits of Chinese patent application No. CN202310925643.6, filed on Jul. 25, 2023, the disclosure of which is incorporated herein by reference in its entirety.

FIELD OF THE PRESENT DISCLOSURE

The present disclosure relates to the technical field of human-computer interaction, in particular to a method and apparatus for determining a point of interest for a user, an electronic device and storage medium.

BACKGROUND OF THE PRESENT DISCLOSURE

In scenes such as automatic driving and auxiliary driving, a vehicle often has an interactive function with a user, wherein the interactive function is based on a Point of Interest (POI) of a user. The interactive function of POI retrieval can provide the user with point of interest information required. For example, if the user wants to learn relevant information about the point of interest on seeing surrounding buildings, parks and other points of interest on the vehicle, the point of interest retrieval function of the vehicle may be triggered by voice so as to provide the user with relevant information about the point of interest. However, since the surrounding environment points of interest may be densely distributed, the accuracy of the determined target points of interest is low and the user experience is poor.

SUMMARY OF THE PRESENT DISCLOSURE

In order to solve the above-mentioned technical problem of low accuracy of a retrieved point of interest, embodiments of the present disclosure provide a method and apparatus for determining a point of interest for a user, an electronic device and storage medium to improve the accuracy of the determination result of the point of interest, thereby improving the user experience.

In a first aspect of the present disclosure, a method for determining a point of interest for a user is provided, wherein the method includes: in response to receiving a point of interest query instruction of a user, determining point of interest classification information about points of interest to be queried based on the point of interest query instruction; acquiring body state information about a user, vehicle state information about a vehicle carrying the user, and surrounding environment information about a pre-set range around the vehicle; determining a set of candidate points of interest based on the vehicle state information, the surrounding environment information and the point of interest classification information; determining scores respectively corresponding to each of the candidate points of interest in the set of candidate points of interest based on the body state information about the user, vehicle state information and a pre-set scoring rule; and determining a target point of interest corresponding to the point of interest query instruction based on scores respectively corresponding to each of the candidate points of interest.

In a second aspect of the present disclosure, an apparatus for determining a point of interest for a user is provided, wherein the apparatus includes: a first processing module configured to, in response to receiving a point of interest query instruction of a user, determine point of interest classification information about points of interest to be queried based on the point of interest query instruction; a first acquisition module configured to acquire body state information about a user, vehicle state information about a vehicle carrying the user, and surrounding environment information about a pre-set range around the vehicle; a second processing module configured to determine a set of candidate points of interest based on the vehicle state information, the surrounding environment information and the point of interest classification information; a third processing module configured to determine scores respectively corresponding to each of the candidate points of interest in the set of candidate points of interest based on the body state information about the user, vehicle state information and a pre-set scoring rule; and a fourth processing module configured to determine a target point of interest corresponding to the point of interest query instruction based on scores respectively corresponding to each of the candidate points of interest.

In a third aspect of the present disclosure, a computer-readable storage medium is provided, storing a computer program thereon for executing the method for determining a point of interest for a user according to any one of the above embodiments of the present disclosure.

In a fourth aspect of the present disclosure, an electronic device is provided, which includes: a processor; a memory for storing the processor-executable instructions; wherein the processor is configured to read the executable instructions from the memory and execute the instructions to implement the method for determining a point of interest for a user according to any one of the above embodiments of the present disclosure.

In a fifth aspect of the present disclosure, a computer program product is provided which, when instructions in the computer program product are executed by a processor, the processor to perform the method for determining a point of interest for a user provided by any one of the above embodiments of the present disclosure.

The above-mentioned embodiments of the present disclosure provide a method and apparatus for determining a point of interest for a user, an electronic device and storage medium; after receiving a point of interest query instruction of a user, point of interest classification information about a point of interest to be queried by the user is determined; combining vehicle state information about a vehicle and surrounding environment information about an environment where the vehicle is located, a set of candidate points of interest is comprehensively determined; then combining body state information about the user and vehicle state information, the candidate points of interest in the set of candidate points of interest are scored using a pre-set scoring rule, and a target point of interest to be queried by the user is determined based on the scores. Since the surrounding environment information may be used to determine the point of interest query range, the accuracy of target points of interest can be improved, and by determining the point of interest classification information, the search range of points of interest may be further reduced, and the accuracy of target points of interest can be further improved; integrating the score determined by the body state information about the user and vehicle state information is helpful to accurately locate the target point of interest, and integrating the multimodal information such as vehicle position, surrounding environment information, body state information about the user and voice information realizes the accurate position of the point of interest of the user, thereby providing more accurate point of interest information for the user and greatly improving the user experience.

BRIEF DESCRIPTION OF THE DRAWINGS

FIG. 6 is a schematic flow diagram of a method for determining a point of interest for a user according to still another example embodiment of the present disclosure;

DESCRIPTION OF THE EMBODIMENTS

In order to explain the present disclosure, example embodiments of the present disclosure will be described in detail below with reference to the accompanying drawings. It is apparent that the described embodiments are only a part of the embodiments of the present disclosure, not all of them, and it is to be understood that the present disclosure is not limited to the example embodiments.

It should be noted that: the relative arrangement of parts and steps, numerical expressions and numerical values set forth in these examples do not limit the scope of the present disclosure unless specifically stated otherwise.

Overview of the Present Disclosure

In scenes such as automatic driving and auxiliary driving, a vehicle often has an interactive function with a user, wherein the interactive function is based on a Point of Interest (POI) of a user. The interactive function of POI retrieval can provide the user with point of interest information required. For example, if the user wants to learn relevant information about the point of interest on seeing surrounding buildings, parks and other points of interest on the vehicle, the point of interest retrieval function of the vehicle may be triggered by voice so as to provide the user with relevant information about the point of interest. However, since the surrounding environment points of interest may be densely distributed, the accuracy of the determined target points of interest is low and the user experience is poor.

Example Overview

Figure 1:
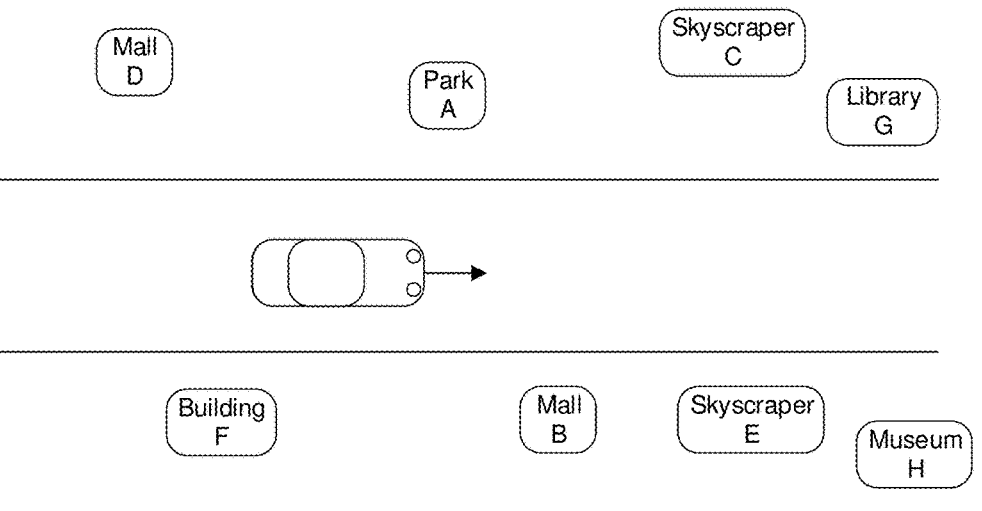
FIG. 1 is an example application scenario of a method for determining a point of interest for a user according to the present disclosure.

FIG. 1 is an example application scenario of a method for determining a point of interest for a user according to the present disclosure.

In the course of driving a vehicle on a road, there are usually a plurality of points of interest within the field of view of the user, for example, malls, parks, various buildings, libraries, museums and the like. With the method for determining a point of interest for a user of the present disclosure, when a user wants to know relevant information about any one of the points of interest, a point of interest query instruction may be issued in any manner, for example, by voice. In response to receiving the point of interest of the user query instruction, an apparatus for determining a point of interest for a user capable of executing the method for determining a point of interest for a user of the present disclosure, which may be configured for the vehicle, may determine point of interest classification information about a point of interest to be queried based on a point of interest query instruction, may acquire body state information about a user, vehicle state information about a vehicle carrying the user and surrounding environment information about a preset range around the vehicle, may determine a set of candidate points of interest which may belong to the point of interest to be queried by the user based on the vehicle state information, the surrounding environment information and the point of interest classification information, and then may determine scores respectively corresponding to each of the candidate points of interest in the set of candidate points of interest based on the body state information about the user, the vehicle state information and a pre-set scoring rule; may determine a target point of interest corresponding to the point of interest query instruction based on the scores respectively corresponding to each of the candidate points of interest, for example, a user says "which park is that?"; based on the point of interest query instruction of the user, it may be determined that the point of interest classification information about the point of interest to be queried is a park; combining vehicle state information, surrounding environment information and the point of interest classification information, the park point of interest in a certain range around the vehicle may be taken as a set of candidate points of interest, and then combining at least one kind of body state information, such as a line-of-sight direction, face orientation, body orientation, pupil focus, gesture pointing direction, etc. of the user, vehicle state information and pre-set scoring rules are used to determine the scores of the park points of interest in the set of candidate point of interests, and then the target point of interest to be queried by the user may be accurately located based on the scores, for example, the target point of interest is park A, so that the relevant introduction information about park A may be obtained and fed back to the user by means of interaction such as voice and display, so that the user may obtain the relevant information about the target point of interest required through simple voice instructions, thereby greatly improving the accuracy of the target point of interest and effectively improving the user experience.

Example Method

Figure 2:
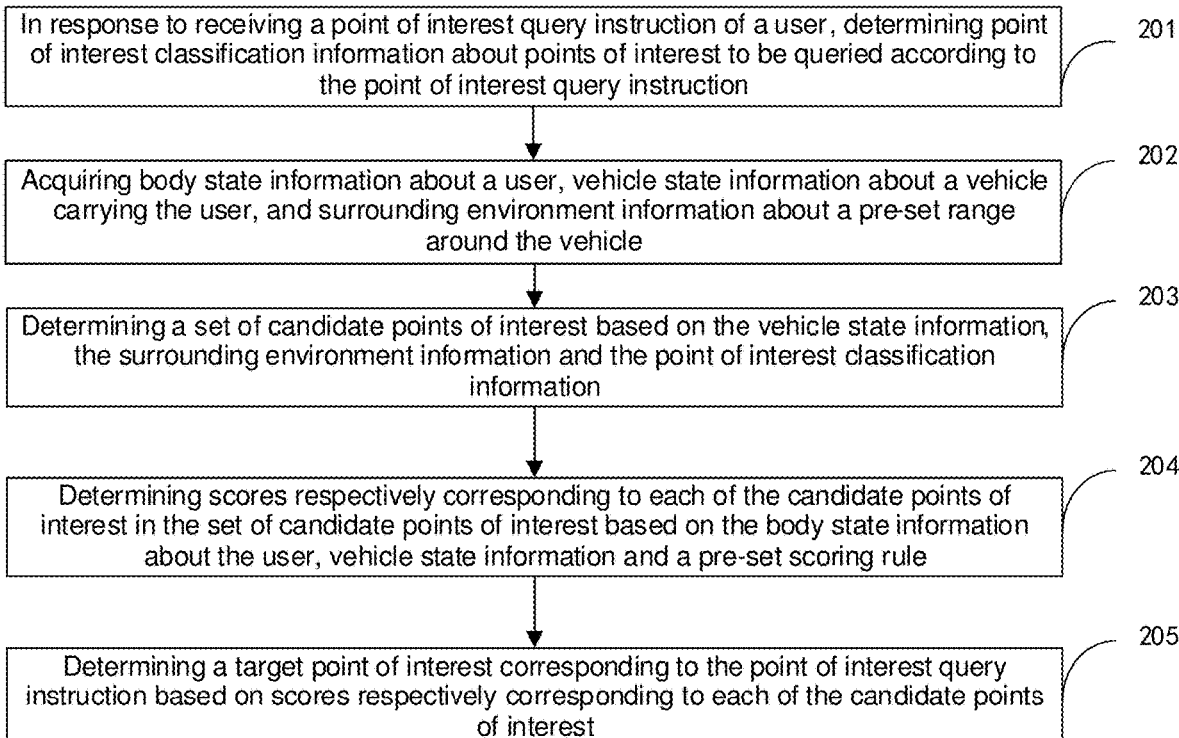
FIG. 2 is a schematic flow diagram of a method for determining a point of interest for a user according to an example embodiment of the present disclosure.

FIG. 2 is a schematic flow diagram of a method for determining a point of interest for a user according to an example embodiment of the present disclosure. The present embodiment may be applied to an electronic device, specifically such as a vehicle-mounted computing platform, and as shown in FIG. 2, and the method includes the following steps:

Step 201: in response to receiving a point of interest query instruction of a user, determining point of interest classification information about points of interest to be queried based on the point of interest query instruction.

The point of interest query instruction may be a voice instruction, and may also be an instruction triggered in other manners, such as a click operation instruction of a virtual button or a physical button on the screen. For example, a point of interest query instruction trigger button is provided on the screen, and a user clicks the button to trigger the point of interest query instruction. It may be specifically set according to actual requirements. The point of interest classification information may include information about whether to obtain the type to which the point of interest to be queried belongs, and the type information (which may also be referred to as a classification type) in the case of obtaining the type to which the point of interest to be queried belongs, and the type of the point of interest (i.e., the classification type) may be set according to actual requirements, and may include one-stage or multi-stage types. Taking the multi-level type as an example, for example, the first level type may include a park, a mall, a gas station, etc., and the second level type of a park may include a sports park, a forest park, a cultural park, etc., the second level type of a mall may include a shopping mall, a hardware mall, an electric appliance mall, etc., and the second level type of a gas station may include a specific gas station brand or a merchant. The specific type level may be set according to actual requirements and is not limited to the foregoing examples.

In some alternative embodiments, for the case where the type of the point of interest to be queried may be determined based on the point of interest query instruction, for example, the user voice content "which park is that?", and the type of the point of interest to be queried may be determined as a park, then the point of interest classification information includes the type of the point of interest to be queried; in the case where the type of the point of interest to be queried cannot be determined according to the point of interest query instruction, for example, the user voice content is "what's that?", or the user triggers the point of interest query instruction by pressing a key, etc., the type of the point of interest to be queried cannot be determined from the point of interest query instruction; then the point of interest classification information includes information characterizing the type which cannot be determined, and the specific information content may be set according to actual requirements, for example, using 0 to represent the information the type of which cannot be determined.

Step 202: acquiring body state information about a user, vehicle state information about a vehicle carrying the user, and surrounding environment information about a pre-set range around the vehicle.

The body state information may be set according to actual requirements, for example, the body state information may include at least one of a body orientation, a face orientation, a line-of-sight direction and a gesture pointing direction of a user in a vehicle coordinate system, and may also include a position of the body of the user in the vehicle and other relevant information, which is not specifically limited. The vehicle state information may include state information such as the position, speed, acceleration and orientation of the vehicle in the reference coordinate system, and may be specifically set according to actual requirements. The reference coordinate system may be a world coordinate system or a relatively stable coordinate system rigidly connected to a world coordinate system. For example, the position of the vehicle may include a longitude coordinate, a latitude coordinate, and an altitude.

In some alternative embodiments, vehicle state information may be obtained based on various sensors on the vehicle. For example, based on data acquired by an Inertial Measurement Unit (IMU) on the vehicle, a speed sensor, an acceleration sensor, a positioning sensor and other sensors, it is possible to acquire the vehicle state information such as the position, speed, acceleration and orientation of the vehicle. The positioning sensor is for example a Global Positioning System or other implementable positioning sensors. It is not specifically limited.

The pre-set range may be set according to actual requirements, for example, a range of a pre-set shape around the center of the rear axle of the vehicle may be set as the pre-set range, and the pre-set shape may be, for example, a rectangle, a circle, an ellipse, etc. and the size of the pre-set shape may be set, for example, for a rectangle, a long side of the rectangle may be set along the length direction of the vehicle, a short side of the rectangle may be set along the width direction of the vehicle, and the pre-set range may be determined by setting the length of the long side and the length of the short side. For example, if the long side is L meters and the short side is W meters, the area of L*W around the vehicle may be determined as the pre-set range. The surrounding environment information may be obtained from previously obtained global environment information, for example, surrounding environment information of a pre-set range around the vehicle is obtained based on a high-precision map. The surrounding environment information may include detailed road information around the vehicle, traffic signs on the road, various points of interest on both sides of the road and other relevant environmental information, and the detailed road information may include, for example, an expressway, a viaduct, a road under the viaduct, etc. and more detailed information, which may be specifically set according to actual requirements.

Step 203: determining a set of candidate points of interest based on the vehicle state information, the surrounding environment information and the point of interest classification information.

The position of the vehicle may be determined based on the vehicle state information, the possible range of the points of interest to be queried of the user may be determined based on the surrounding environment information, and the query type of the points of interest to be queried may be determined based on the point of interest classification information; therefore, all the points of interest which may be the points of interest to be queried of the user may be determined from all the surrounding points of interest based on the vehicle state information, the surrounding environment information and the point of interest classification information to form a set of candidate points of interest.

Illustratively, the point of interest query instruction is a voice instruction, and the content of the voice instruction is "which park is that?", and then it is determined that the point of interest classification information includes the type of the point of interest to be queried as a park, and all parks within a pre-set range around the vehicle may be formed into a set of candidate points of interest based on the position of the vehicle and surrounding environment information.

Step 204: determining scores respectively corresponding to each of the candidate points of interest in the set of candidate points of interest based on the body state information about the user, vehicle state information and a pre-set scoring rule.

The pre-set scoring rule may be set according to actual requirements, for example, user body state information and vehicle state information affecting scoring may be respectively taken as parameters, and a scoring mapping function about each parameter may be set as the pre-set scoring rule, and then the scoring mapping function may be substituted according to actual parameter values to obtain scores respectively corresponding to each of the candidate points of interest.

In some alternative embodiments, the pre-set scoring rule may also be a pre-trained score predictive model, and the network structure of the score predictive model may be set according to actual requirements, for example, any practical convolutional neural network-based model or other type of neural network-based model may be used, which is not specifically limited.

Step 205: determining a target point of interest corresponding to the point of interest query instruction based on scores respectively corresponding to each of the candidate points of interest.

After obtaining the scores respectively corresponding to each of the candidate points of interest, ranking may be performed according to the score level to obtain a ranking result, and one or more candidate points of interest with the highest score may be taken as a target point of interest. The number of specific target points of interest may be set according to actual requirements. For example, one candidate point of interest with the highest score is taken as the target point of interest, or two candidate points of interest with the top scores are taken as the target points of interest, sorted by score from high to low.

According to the apparatus for determining a point of interest for a user of the embodiments of the present disclosure, after receiving a point of interest query instruction of a user, point of interest classification information about a point of interest to be queried by the user is determined; combining vehicle state information about a vehicle and surrounding environment information about an environment where the vehicle is located, a set of candidate points of interest is comprehensively determined; then combining body state information about the user and vehicle state information, the candidate point of interest in the set of candidate points of interest is scored using a pre-set scoring rule, and a target point of interest to be queried by the user is determined according to the score. Since the surrounding environment information may be used to determine the point of interest query range, the accuracy of target points of interest may be improved, and by determining the point of interest classification information, the search range of points of interest may be further reduced, and the accuracy of target points of interest may be further improved; integrating the score determined by the body state information about the user and vehicle state information is helpful to accurately locate the target point of interest, and integrating the multimodal information such as vehicle position, surrounding environment information, body state information about the user and voice information realizes the accurate position of the point of interest of the user, which may provide more accurate point of interest information for the user and greatly improve the user experience.

Figure 3:
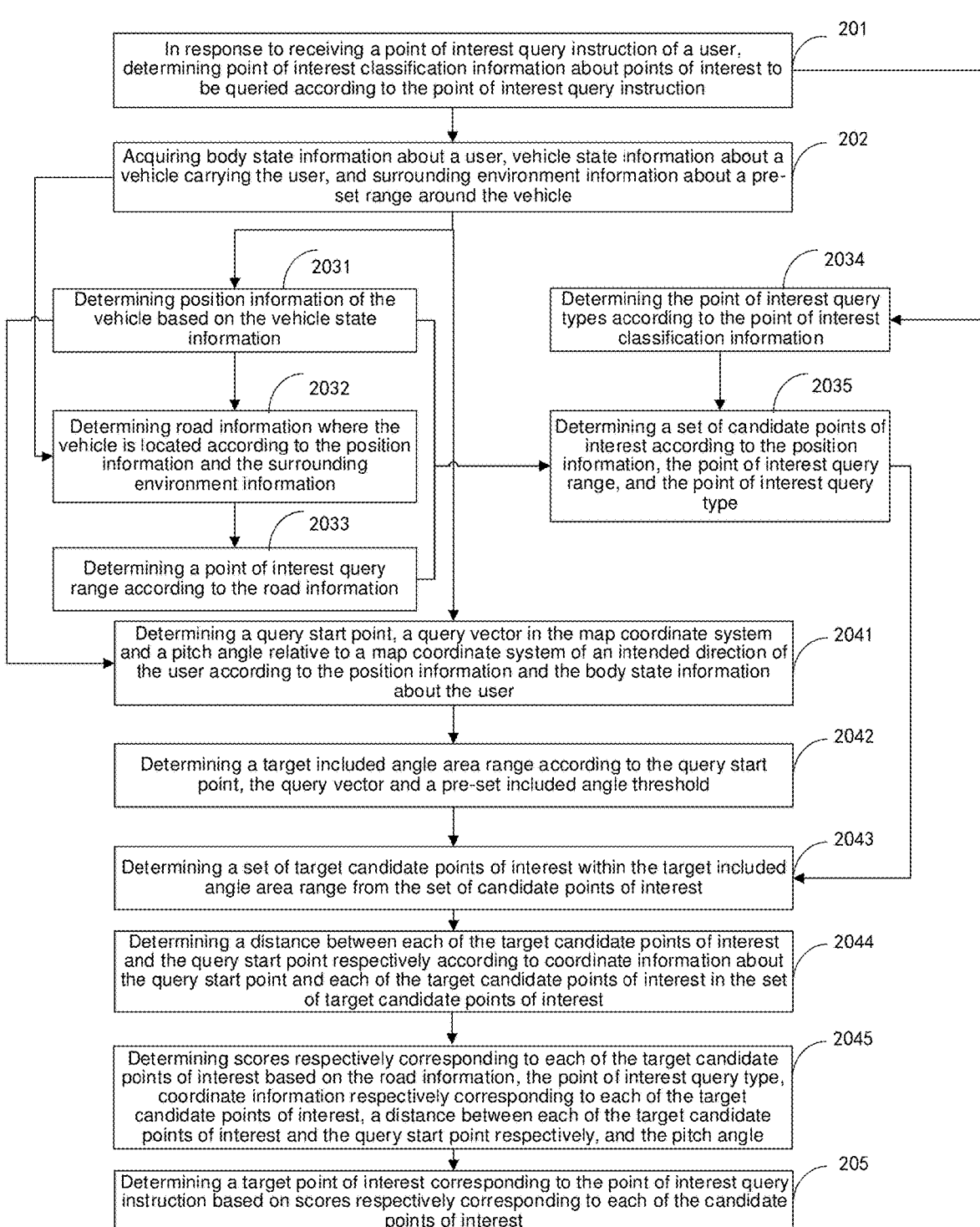
FIG. 3 is a schematic flow diagram of a method for determining a point of interest for a user according to another example embodiment of the present disclosure.

FIG. 3 is a schematic flow diagram of a method for determining a point of interest for a user according to another example embodiment of the present disclosure.

In some alternative embodiments, the step 203 of determining a set of candidate points of interest based on the vehicle state information, the surrounding environment information and the point of interest classification information includes:

Step 2031: determining position information of the vehicle based on the vehicle state information.

The vehicle state information includes position information about the vehicle, and therefore the position information about the vehicle may be determined based on the vehicle state information, and the position information about the vehicle may include coordinates of the vehicle in a reference coordinate system. For example, the aforementioned dimensional coordinates (including longitude coordinates and dimensional coordinates) and height.

Step 2032: determining road information where the vehicle is located based on the position information and the surrounding environment information.

The road information where the vehicle is located may include high-precision map information about the road where the vehicle is located. For example, the surrounding environment information is high-precision map information, the specific position of the vehicle in the high-precision map is determined according to the position information about the vehicle, for example, the position information about the vehicle is converted to the high-precision map coordinate system according to the conversion relationship between the reference coordinate system and the high-precision map coordinate system to obtain the specific position of the vehicle in the high-precision map coordinate system, i.e., the specific position of the vehicle in the high-precision map, and then the high-precision map information about the corresponding road in the high-precision map is acquired as the road information where the vehicle is located in combination with the specific position of the vehicle in the high-precision map, the road information may include map coordinates of a position where the vehicle is located and specific attribute information of a road where the map coordinates are located and a relationship between the road where the road is located and other roads or map objects, for example, on a viaduct or under a viaduct. The specific road information may be set according to actual requirements.

Step 2033: determining a point of interest query range based on the road information.

The point of interest query range may be a surrounding area range visible to a user centered on a vehicle or a user, and may be represented by a relative distance range; for example, the point of interest query range of a meters ahead, b meters behind, c meters to the left, and d meters to the right may be represented by [a, b, c, d]. The range around which the user may see may be different when the vehicle is on different roads and at different positions of the road, for example, on a viaduct and under a viaduct, and on this basis, a point of interest query range may be further determined according to actual road information so as to further narrow the query range.

In some alternative embodiments, a point of interest query range corresponding to various types of road information may be set in advance for different types of road information in combination with the possible field of view of the user in the vehicle. For example, for a road with a relatively wide field of view, the point of interest query range may be set to be larger, such as represented by [a1, b1, c1, d1], and for a road with a relatively blocked field of view, the point of interest query range may be set to be smaller, such as represented by [a2, b2, c2, d2], where at least one of a2 is smaller than a1, b2 is smaller than b1, c2 is smaller than c1, and d2 is smaller than d1 is satisfied. It may be specifically set according to actual requirements.

Step 2034: determining a point of interest query type based on the point of interest classification information.

The point of interest query type may include one or more point of interest types, and be specifically determined according to the point of interest classification information.

In some alternative embodiments, if the point of interest classification information includes a type of the point of interest to be queried, the type may be regarded as a point of interest query type. If the point of interest classification information does not include the type of the point of interest to be queried, for example, the above-mentioned case where the type of the point of interest to be queried cannot be determined according to the point of interest query instruction, a plurality of preconfigured point of interest types may be taken as the point of interest query type for this time. The preconfigured plurality of point of interest types may be a list of pre-set point of interest types, for example, a list of point of interest types may be set in advance by integrating the point of interest types that may be seen on the vehicle. Points of interest that are not likely to be seen on the vehicle (e.g., indoor facilities, unobstructed elevators, etc.) are disregarded to improve query efficiency and avoid invalid point of interest queries.

Step 2035: determining the set of candidate points of interest based on the position information, the point of interest query range and the point of interest query type.

A start position or center of the point of interest to be queried may be determined based on the position information, the point of interest query range defines the range of the point of interest to be searched, and the point of interest query type defines the type of the point of interest to be searched; based on the position information, the point of interest query range and the point of interest query type, points of interest satisfying the above-mentioned conditions may be searched in the point of interest library, i.e., points of interest satisfying the point of interest query type within the point of interest query range with the position information as the center, and these points of interest may be taken as candidate points of interest to form a set of candidate points of interest.

In some alternative embodiments, with a point of interest search engine, a search may be performed using the point of interest search engine to obtain a set of candidate points of interest. For example, according to input parameter requirements of a point of interest search engine, position information, a point of interest query range and a point of interest query type may be converted into search parameters of the point of interest search engine, and the search parameters may be transmitted to the search engine, so that the search engine searches a point of interest library according to the search parameters to obtain a set of candidate points of interest.

In the embodiments of the present disclosure, by determining road information on which a vehicle is located, a point of interest query range may be determined according to road information, which helps to improve the accuracy of a search range, and thus may improve search efficiency and further improve the accuracy of a target point of interest. In addition, the point of interest query type may be determined according to the point of interest classification information, so as to further improve the accuracy and efficiency of point of interest search, and further improve the effectiveness of the set of candidate points of interest determined, so as to further obtain accurate target points of interest by scoring.

In some alternative embodiments, the step 2034 of determining a point of interest query type based on the point of interest classification information includes:

in response to the point of interest classification information including a classification type to which a point of interest to be queried belongs, taking the classification type as the point of interest query type; in response to the point of interest classification information including a classification type to which the point of interest to be queried belongs being not identified, taking each preset type in a set of pre-set types as the point of interest query type.

The classification type refers to the types of the above-mentioned points of interest, and may include one-stage or multi-stage types, and reference may be made to the above-mentioned contents in particular, and the description thereof will not be repeated here. The point of interest classification information includes the classification type to which the point of interest to be queried belongs being not identified, i.e., the above-mentioned case where the type of the point of interest to be queried cannot be determined according to the point of interest query instruction, and the description thereof will not be repeated here. The pre-set type set may include a pre-configured plurality of point of interest types, where the pre-set type set is a pre-set set of classification point of interest types which may be concerned by a user on a vehicle, and classification types which may not be concerned by a user, such as indoor facilities and barrier-free elevators, are not added into the pre-set type set, so that the efficiency of points of interest search may be improved and the search of invalid points of interest may be avoided.

In some alternative embodiments, for each road a type set corresponding to the road may also be set in advance as a pre-set type set corresponding to the road, and the pre-set type set may, for example, be represented as a pre-set point of interest type list; And in practical applications, if the point of interest classification information does not include a point of interest type, a corresponding pre-set type set may be further obtained according to the road where the vehicle is located, and each pre-set type (classification type) in the pre-set type set may be taken as a point of interest query type, so as to further improve the accuracy of point of interest search and improve the search efficiency.

According to the embodiments of the present disclosure, by regarding the classification type as the point of interest query type in the case where the classification type of the point of interest to be queried may be determined, the point of interest of the classification type may therefore be directly searched in the point of interest search, and search efficiency and accuracy may be further improved. In the case where the classification type of the point of interest to be queried cannot be determined, the pre-set type of the pre-set type set which may be concerned by the vehicle user is taken as the point of interest query type, so as to ensure that the point of interest to be queried of the user is in the point of interest query type and improve the reliability of the point of interest search.

In some alternative embodiments, the step 2035 of determining the set of candidate points of interest based on the position information, the point of interest query range, and the point of interest query type includes:

generating a search parameter based on the position information, the point of interest query range and the point of interest query type; searching, based on the search parameter, a pre-configured point of interest library to obtain the set of candidate points of interest.

The search parameter may be a parameter of a pre-set format required for performing a point of interest search in a point of interest library, and the specific parameter format may be set according to actual requirements, to which the present disclosure is not limited. For example, a search origin point parameter is generated according to position information, a search range parameter is generated according to a point of interest query range, and a search type parameter is generated according to a point of interest query type, so that a search origin point may be determined in a point of interest library according to the search origin point parameter in the search parameters, and then a search range in the point of interest library is defined according to the search range parameter, and a point of interest of a corresponding type is searched in the search range according to the search type parameter to obtain a set of candidate points of interest.

In some alternative embodiments, the operation of obtaining the set of candidate points of interest by searching the pre-configured point of interest library according to the search parameter may be implemented based on a pre-configured point of interest search engine, and then the search parameter may be transmitted to the point of interest search engine, and the search engine obtains and feeds back the set of candidate points of interest from the point of interest library according to the search parameter.

In some alternative embodiments, the point of interest search engine may be deployed on a vehicle, or may be deployed in a server, such as a cloud server, a physical server, or a cluster of servers, depending on actual requirements.

In some alternative embodiments, the step 2035 of determining the set of candidate points of interest based on the position information, the point of interest query range, and the point of interest query type includes:

generating a search parameter based on the position information, the point of interest query range and the point of interest query type; transmitting the search parameter to a server so that the server searches based on the search parameter to obtain the set of candidate points of interest; and receiving the set of candidate points of interest transmitted from the server.

The server may be any one of a cloud server, a physical server, a server cluster, etc., and may be specifically set according to actual requirements. The vehicle may transmit the search parameter and receive the set of candidate points of interest by communicating with the server, to which the specific communication mode is not limited.

In some alternative embodiments, a point of interest search engine may be deployed in the server, and after receiving the search parameters, the server transmits the search parameters to the point of interest search engine, uses the point of interest search engine to search the point of interest library to obtain a set of candidate points of interest, and transmits same to the apparatus of the vehicle via the server, and the apparatus of the vehicle performs subsequent target point of interest determination.

By deploying the search of the set of candidate points of interest on the server, the embodiment of the present disclosure may realize the fast search of the set of candidate points of interest based on the more powerful and fast search capability of the server, improve the search efficiency, and may reduce the occupation of vehicle-side resources.

In some alternative embodiments, the step 204 of determining scores respectively corresponding to each of the candidate points of interest in the set of candidate points of interest based on the body state information about the user, vehicle state information and a pre-set scoring rule includes:

Step 2041: determining a query start point, a query vector in a map coordinate system and a pitch angle relative to the map coordinate system of an intended direction of the user based on the position information and the body state information about the user.

Wherein the intended direction of the user refers to a direction of the point of interest to be queried which the user intends to query. The query start point in the map coordinate system may refer to a position of the user or the vehicle in the map coordinate system, and in order to determine the target point of interest of the user more accurately, the start point for determining the user intended direction may be taken as the query start point, for example, if the user intended direction is determined based on the line-of-sight direction of the user, the query start point is the position of the eyes of the user in the map coordinate system, and the query vector refers to the projection vector of the user intended direction vector in the map coordinate system. The pitch angle of the intended direction with respect to the map coordinate system refers to the included angle between the direction vector of the intended direction of the user and the map coordinate system. The map coordinate system is a two-dimensional coordinate system, and the pitch angle may be specifically represented by the included angle between the direction vector of the intended direction and the XOY plane of the map coordinate system.

Step 2042: determining a target included angle area range based on the query start point, the query vector and a pre-set included angle threshold.

The pre-set included angle threshold may be set according to actual requirements, for example, the pre-set included angle threshold may be set according to the field of view range of the user. For example, the pre-set included angle threshold may be 60 degrees, 70 degrees, 80 degrees, etc., which is not specifically limited. The target included angle area range may be a sector area range with the query start point as a fan center, the query vector as a central line and a certain included angle on either side.

Step 2043: determining a set of target candidate points of interest within the target included angle area range from the set of candidate points of interest.

The set of candidate points of interest may include coordinate information about each of the candidate points of interest in a map coordinate system, the coordinate information may include coordinates of representative points of the points of interest and/or boundary coordinate information, and the boundary coordinate information may include, for example, a boundary point sequence of the candidate points of interest. For a candidate point of interest occupying a larger area in the map coordinate system, the coordinate of a representative point of the candidate point of interest and boundary coordinate information about the candidate point of interest may be included. The boundary point sequence is an ordered sequence formed by a plurality of coordinate points on the boundary of a polygon area occupied by the candidate point of interest in the map coordinate system. For example, for a larger building, a rectangular area is represented in a map coordinate system, the coordinate information thereof includes the coordinate of the center point of the rectangular area and a rectangular area boundary point sequence, the boundary point sequence may be the coordinate of four corner points of the rectangular area, the number of coordinate points included in a specific boundary point sequence may be set according to actual requirements, for example, for a rectangular area, the boundary point sequence thereof may also be represented by more than four coordinate points. For polygon points of interest on more sides, the boundary point sequence may include the coordinates of a plurality of corner points, and may also include other coordinates on each side.

By matching the coordinate information and/or boundary information about each of the candidate points of interest in the set of candidate points of interest with the target included angle area range, a set of target candidate points of interest within the target included angle area range may be determined.

Figure 4:
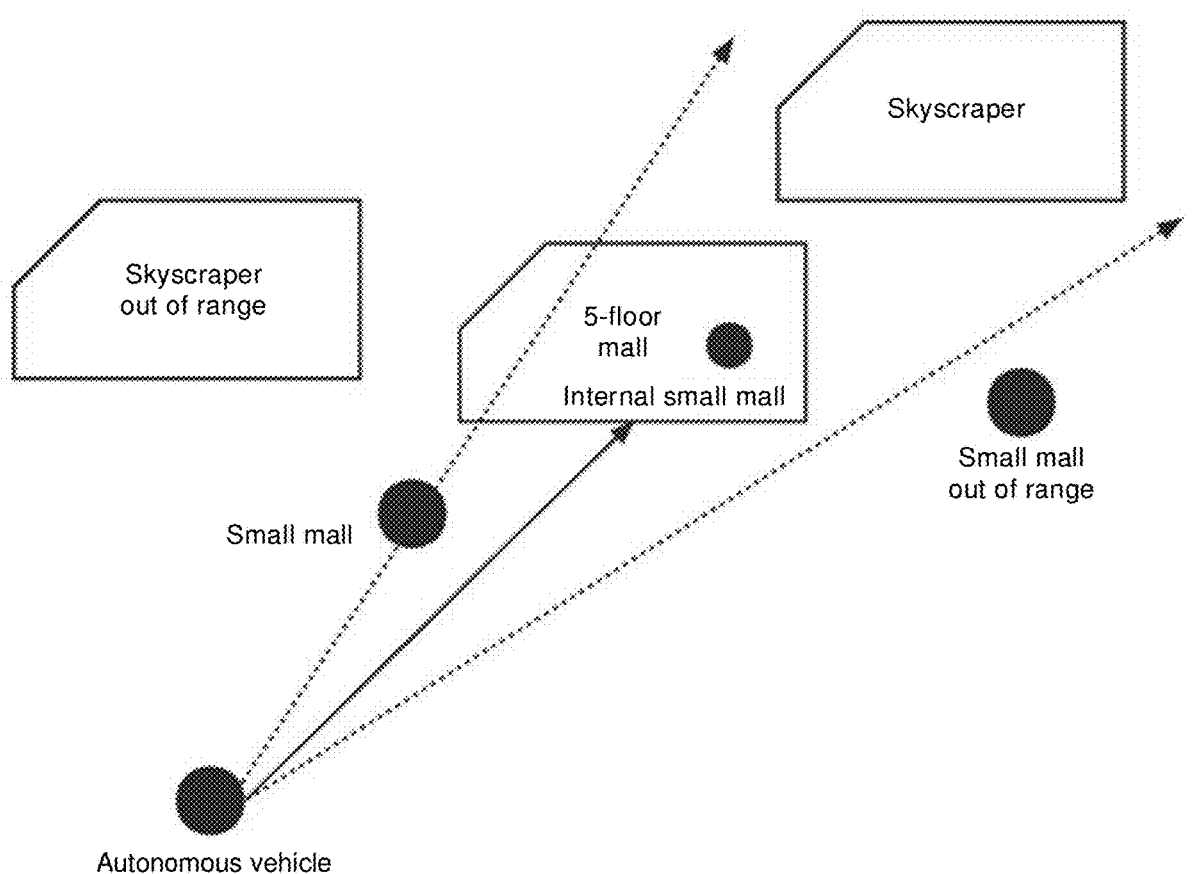
FIG. 4 is a schematic diagram of a target included angle area range according to an example embodiment of the present disclosure.

In some alternative examples, FIG. 4 is a schematic diagram of a target included angle area range according to an example embodiment of the present disclosure. In the map coordinate system, an autonomous vehicle represents a vehicle in the map coordinate system, a black dot represents a coordinate point in the map coordinate system, a pentagon represents an area occupied by a point of interest in the map coordinate system, a black solid arrow represents a query vector, and a sector area between dashed arrows on either side is an target included angle area range. According to the relationship between each of the candidate points of interest and the target included angle area range, the set of target candidate points of interest within the target included angle area range may be determined, so that the candidate points of interest out of the target included angle area range are excluded, and the range of the points of interest to be queried is further reduced.

Step 2044: determining a distance respectively between each of the target candidate points of interest and the query start point based on coordinate information about the query start point and each of the target candidate points of interest in the set of target candidate points of interest.

The distance between the target candidate point of interest and the query start point may be obtained by calculation based on a distance formula between two points.

Step 2045: determining scores respectively corresponding to each of the target candidate points of interest based on the road information, the point of interest query type, coordinate information respectively corresponding to each of the target candidate points of interest, a distance respectively between each of the target candidate points of interest and the query start point, and the pitch angle.

Road information, the point of interest query type, the coordinate information respectively corresponding to each of the target candidate points of interest, and a distance respectively between each of the target candidate points of interest and the query start point, and the pitch angle may be respectively taken as or converted into parameters of a mapping function for determining a score and/or input data of a score predictive model, and then scores respectively corresponding to each of the target candidate points of interest may be determined based on the mapping function and/or the score predictive model.

In some alternative examples, for a mapping function for determining a score, referring to the scenario shown in FIG. 4, if the content of a point of interest query instruction of a user is "which building is that?", and in general, coordinate information about a point of interest of a building type includes coordinates of a representative point and boundary coordinate information, the point of interest of a pentagon within the target included angle area range has a higher score, and a small mall only includes a single point with a lower coordinate score. The difference of distance may be corrected according to the pitch angle, such as the skyscrapers in the figure, when the pitch angle is smaller, the score will be lower, and when the pitch angle is larger, the score will be higher. On the basis of road information, for example on a viaduct, points of interest that are closer and lower than the visible angle will have a lower score, and points of interest that are higher within the visible range will have a correspondingly higher score. A score corresponding to each of the target candidate points of interest is determined by combining a plurality of parameters, for example, by weighting the scores of a plurality of parameters.

In some alternative examples, a score predictive model may be trained through a large amount of historical data, so that the score predictive model learns the influence of various factors on the score to obtain a trained score predictive model, hence the road information, the point of interest query type, coordinate information respectively corresponding to each of the target candidate points of interest, the distance respectively between each of the target candidate points of interest and the query start point, and the pitch angle may be converted into the model input data, and the score respectively corresponding to each of the target candidate points of interest may be predicted through the score predictive model.

In some alternative embodiments, the scores obtained by both the mapping function and the score predictive model may be integrated to determine the final scores respectively corresponding to each of the target candidate points of interest, so as to further improve the accuracy and reliability of the scores.

By determining a query start point, a query vector and a pitch angle in a direction intended by a user, an embodiment of the present disclosure may determine a target included angle area range visible to the user according to the query start point and the query vector, so that invalid candidate points of interest may be further excluded, which helps to further improve the accuracy of target points of interest. By combining the road information, the point of interest query types, the coordinate information corresponding to each of the target candidate points of interest, the distance between each of the target candidate points of interest and the query start point, and pitch angle to determine the score of each of the target candidate points of interest, the accuracy and reliability of the score may be effectively improved, and the accuracy of target point of interest may be further improved.

In some alternative embodiments, the step 2041 of determining a query start point, a query vector in a map coordinate system and a pitch angle relative to the map coordinate system of an intended direction of the user based on the position information and the body state information about the user includes:

determining at least one of a line-of-sight direction, a face orientation, a body orientation, and a gesture pointing direction of the user based on the position information and the body state information about the user; determining a three-dimensional direction vector of the intended direction of the user under a three-dimensional reference coordinate system based on at least one of the line-of-sight direction, the face orientation, the body orientation, and the gesture pointing direction; converting the three-dimensional direction vector to the map coordinate system to obtain the query vector of the intended direction in the map coordinate system; and taking an included angle between the three-dimensional direction vector and an XOY plane of the map coordinate system as the pitch angle.

The body state information about the user may include at least one of a body orientation, a face orientation, a line-of-sight direction and a gesture pointing direction of the user in a vehicle coordinate system, and may also include a position of the body of the user in the vehicle and other relevant information, which may be specifically set according to actual requirements. From the position information of the vehicle and the body state information about the user, the state information about the user in the three-dimensional reference coordinate system, i.e., the aforementioned reference coordinate system, may be determined by coordinate system conversion. A three-dimensional direction vector of an intended direction of the user may be determined according to state information about the user in a three-dimensional reference coordinate system; a query vector may be obtained by converting the three-dimensional direction vector into a map coordinate system; and the above-mentioned pitch angle may be obtained by calculating an included angle between the three-dimensional direction vector and an XOY plane of the map coordinate system.

In some alternative embodiments, the line-of-sight direction of the user may be obtained based on any implementable line-of-sight detection algorithm or line-of-sight detection model. For example, an image containing eyes of a user may be acquired by a camera in a vehicle, and the eye image of the user may be input into a line-of-sight detection model to obtain a line-of-sight direction of the user.

In some alternative embodiments, the face orientation of the user may be obtained by a face orientation predictive model to predict based on an image containing the face of the user.

In some alternative embodiments, the body orientation of the user may be obtained by a body orientation predictive model to predict based on an image containing the upper body of the user.

In some alternative embodiments, for the gesture pointing direction of the user, the hand joint point coordinates of the user may be detected through a hand joint point detection model based on an image containing the hands of the user, and the gesture pointing direction of the user may be determined based on the hand joint point coordinates. Or a corresponding relationship between the gesture type and the direction may be predefined, and the gesture type is identified via the hand image, and then the gesture pointing direction is determined according to the corresponding relationship between the gesture type and the direction. The specific determination method is not limited.

In some alternative embodiments, a three-dimensional direction vector for the intended direction of the user may be determined by integrating various directions of the line-of-sight direction, face orientation, body orientation, and gesture pointing direction to improve the accuracy of the intended direction. A three-dimensional direction vector is determined, for example, in conjunction with the face orientation and line-of-sight direction of the user.

According to embodiments of the present disclosure, a three-dimensional direction vector of a direction intended by a user is determined through at least one of a line-of-sight direction, a face orientation, a body orientation, and a gesture pointing direction of the user, helping to improve the accuracy of a query vector, thereby improving the accuracy of a target point of interest.

In some alternative embodiments, the step 2044 of determining a distance respectively between each of the target candidate points of interest and the query start point based on the query start point and coordinate information about each of the target candidate points of interest in the set of target candidate points of interest includes:

for any one of the target candidate points of interest, determining a first state whether the target candidate point of interest comprises a polygon area boundary point sequence; in response to the first state being comprising, determining a target boundary point which is closest to the query start point in a polygon area boundary point sequence of the target candidate point of interest, so as to take the distance between the target boundary point and the query start point as the distance between the target candidate point of interest and the query start point; and in response to the first state being not comprising, determining a distance between the target candidate point of interest and the query start point based on a distance between a position coordinate point included in coordinate information of the target candidate point of interest and the query start point.

The first state may be determined according to the specific content of the coordinate information about the target candidate point of interest, for example, the first state being including may be determined if the coordinate information includes a boundary point sequence in addition to a single coordinate point, and the first state is determined to be not included if the coordinate information includes only a single coordinate point. Or in the coordinate information about the points of interest in the point of interest library, for the points of interest including a polygonal rectangular area boundary point sequence, an identifier including a polygonal area boundary point sequence may be provided, the first state may be determined according to the identifier, and the specific determination method may be set according to actual requirements, to which the present disclosure is not limited. For a target candidate point of interest which does not include a polygon area boundary point sequence, it is sufficient to directly calculate a distance according to coordinates of a position coordinate point of the target candidate point of interest and a query start point. For a target candidate point of interest including a polygon area boundary point sequence, a distance may be calculated according to the coordinates of each boundary point in the boundary point sequence and the target candidate point of interest respectively, and the distance corresponding to the nearest target boundary point is taken as the distance between the target candidate point of interest and the query start point.

The disclosed embodiment uses the nearest distance to the query start point in the polygon area boundary point sequence for the determination of the score, and since the actual spatial area in the three-dimensional reference coordinate system corresponding to the nearest boundary point is the area most likely to be noticed by the user, it may be more accurately determined whether the user may see the point of interest, and thus has a higher impact on the score, so that the accuracy and reliability of the score may be further improved.

In some alternative embodiments, the step 2045 of determining scores respectively corresponding to each of the target candidate points of interest based on the road information, the point of interest query type, coordinate information respectively corresponding to each of the target candidate points of interest, a distance respectively between each of the target candidate points of interest and the query start point, and the pitch angle includes:

determining model input data based on the road information, the point of interest query type, coordinate information respectively corresponding to each of the target candidate points of interest, a distance respectively between each of the target candidate points of interest and the query start point, and the pitch angle; and processing the model input data using a score predictive model obtained by pre-training to obtain scores respectively corresponding to each of the target candidate points of interest.

The score predictive model may be implemented using any implementable network structure, which is not specifically limited. The format of the model input data may be set according to the specific requirements of the model. For example, road information, a point of interest query type, coordinate information respectively corresponding to each of the target candidate points of interest, a distance between each of the target candidate points of interest and a query start point, and a pitch angle are converted into feature vectors suitable for model input as model input data.

According to the embodiment of the present disclosure, a score predictive model is obtained by pre-training, and then scores respectively corresponding to each of the target candidate points of interest is predicted based on the score predictive model, thereby improving the accuracy of the score due to a strong generalization ability of the model.

Figure 5:
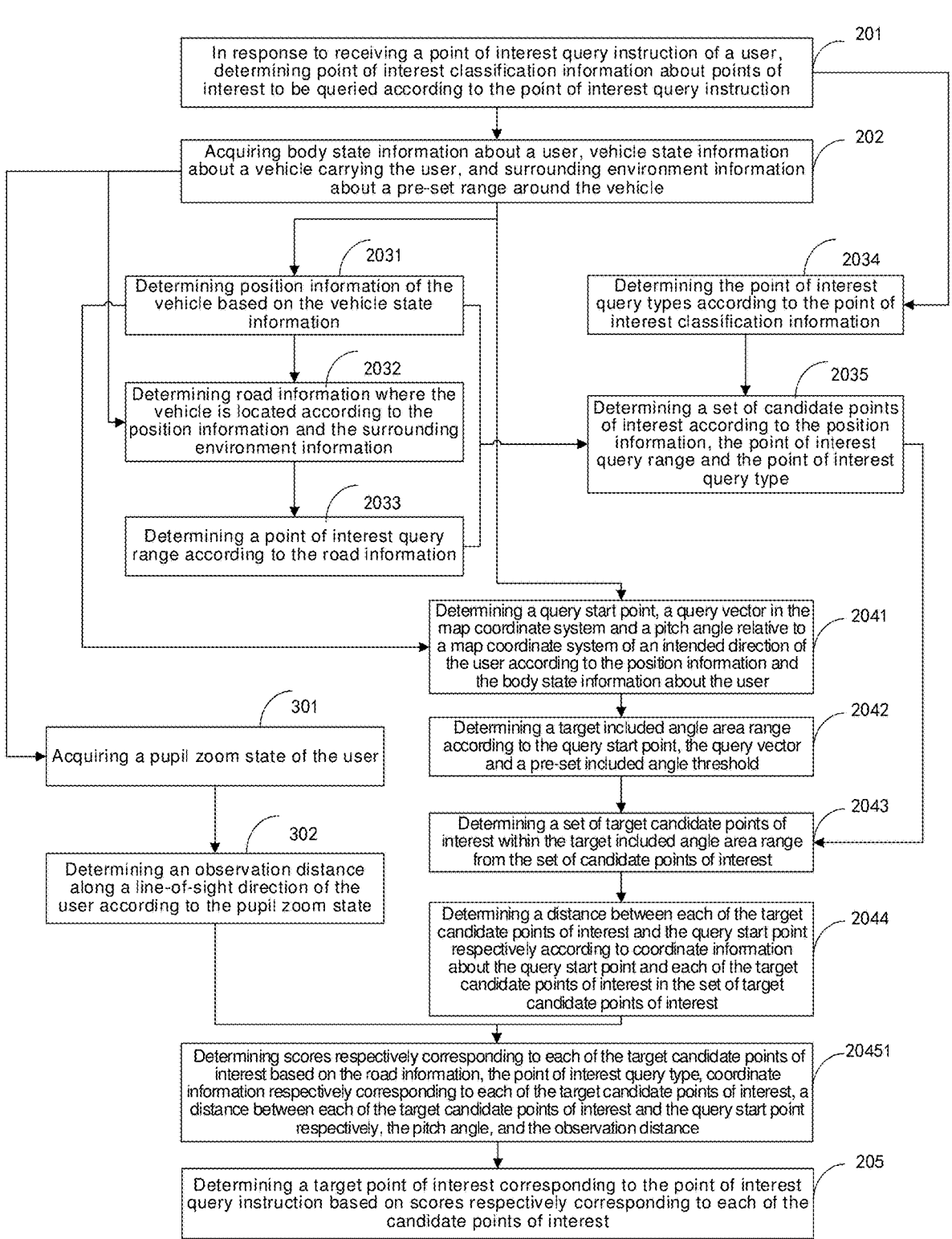
FIG. 5 is a schematic flow diagram of a method for determining a point of interest for a user according to yet another example embodiment of the present disclosure.

FIG. 5 is a schematic flow diagram of a method for determining a point of interest for a user according to yet another example embodiment of the present disclosure.

In some alternative embodiments, the method of embodiments of the present disclosure further includes:

Step 301: acquiring a pupil zoom state of the user.

The pupil zoom state of the user may be obtained using a pupil zoom state detection algorithm or model based on an image containing eyes of the user.

Step 302: determining an observation distance along a line-of-sight direction of the user based on the pupil zoom state.

Different zoom states of the pupil may represent different focus distances of the user, and on this basis, an observation distance of the user along the line-of-sight direction may be determined according to the pupil zoom state of the user.

In some alternative embodiments, a mapping relationship between the pupil zoom state and the observation distance may be established in advance by acquiring images of a plurality of pupil zoom states of the user and confirming the observation distance at the various zoom states by the user under authorization of the user, so that the observation distance of the user may be determined according to the mapping relationship.

The step 2045 of the determining scores respectively corresponding to each of the target candidate points of interest based on the road information, the point of interest query type, coordinate information respectively corresponding to each of the target candidate points of interest, a distance respectively between each of the target candidate points of interest and the query start point, and the pitch angle includes:

step 20451: determining scores respectively corresponding to each of the target candidate points of interest based on the road information, the point of interest query type, the coordinate information respectively corresponding to each of the target candidate points of interest, the distance respectively between each of the target candidate points of interest and the query start point, the pitch angle, and the observation distance.

The observation distance of the user is taken as an influencing factor of the score, and is used to determine the score respectively corresponding to each of the target candidate points of interest together with other factors. The way in which the score is specifically determined may be a mapping function or a score predictive model, with the exception of one more parameter or one more set of features in the model input data, see in particular the previous embodiments, which will not be described in detail here.

Embodiments of the present disclosure may further improve the accuracy and reliability of the score by determining the observation distance of the user in the line-of-sight direction based on the pupil zoom state of the user as a further factor in determining the score.

FIG. 6 is a schematic flow diagram of a method for determining a point of interest for a user according to still another example embodiment of the present disclosure.

In some alternative embodiments, the method of embodiments of the present disclosure further includes:

step 401: acquiring voice data of the user.

The voice data of the user may be obtained by a voice acquisition device on the vehicle, such as a microphone.

Step 402: performing voice recognition on the voice data to obtain text information.

The voice recognition may be obtained based on a pre-trained voice recognition algorithm or model recognition. The specific voice recognition model may be set according to actual requirements, to which the present disclosure is not limited.

Step 403: in response to the text information satisfying the point of interest query condition, determining that a point of interest query instruction of the user is received.

After recognizing and obtaining the text information, whether the content of the text information satisfies the point of interest query condition may be understood based on Natural Language Understanding (NLU). The point of interest query condition may be set according to actual requirements, for example, the point of interest query condition may include pre-set keywords and/or pre-set conversation templates. Examples of keywords include "that", "that is", "there", "what", etc.

By acquiring the voice data of the user to determine whether to issue a point of interest query instruction, the embodiments of the present disclosure may enable the user to query a point of interest through a simple voice instruction, thereby further improving the riding experience of the user.

In some alternative embodiments, the user may be pre-prompted for an action to query for a point of interest, enabling the user to master the point of interest query function more accurately to provide the user with the target point of interest queried more accurately. For example, if the user wants to know about a point of interest during driving, a point of interest query instruction may be triggered by a simple voice, and the line-of-sight direction is kept towards the point of interest for a certain time, then the target point of interest to be queried by the user may be accurately determined directly according to the line-of-sight direction of the user, so as to further improve the accuracy of the target point of interest.

In some alternative embodiments, after the step 205 of determining a target point of interest corresponding to the point of interest query instruction based on scores respectively corresponding to each of the candidate points of interest, the method further includes:

Step 206: generating query result information corresponding to the point of interest query instruction based on the target point of interest.

The query result information may include relevant information about the target point of interest which is understood by the query intention of the user. For example, the query result information may include introduction information for the target point of interest. Also, according to the question of the point of interest query instruction of a user, the content information obtained to answer the user may be specifically set according to actual requirements.

Illustratively, when the voice content is "which park is that?" of the user, after determining the target point of interest of the user, brief introduction information about the park is obtained as query result information.

In some alternative embodiments, the query result information may be obtained from the description information corresponding to the points of interest in the point of interest library, and may also be obtained through other online search engines, and the specific manner of obtaining is not limited.

Step 207: outputting the query result information in a pre-set manner.

The pre-set manner may be set according to actual requirements, for example, the pre-set manner may include at least one manner of voice broadcast, video play, text display, etc., which is not specifically limited.

By obtaining query result information about a target point of interest and outputting same to a user, the embodiments of the present disclosure may make the user know relevant information about the target point of interest in time, thereby further improving the riding experience of the user.

The embodiment of the present disclosure provides a method for determining a point of interest for a user, which combines multi-modal information, such as vehicle state information, surrounding environment information where a vehicle is located, various body state information about a user, user voice, user pupil focusing (zooming) state and so on, and determines a more accurate and reliable set of target candidate points of interest by reducing the search range several times, and then scores the target candidate points of interest in the set of target candidate points of interest by integrating various factors, and obtains accurate and effective target points of interest based on the scores, thus realizing accurate determination of a target point of interest of a user with a large number of points of interest at high and low distances in the field of view, and providing the user with query result information corresponding to the target point of interest to feed back to the user, so that the user may obtain relevant information about the point of interest to be queried through a simple voice instruction, thus greatly improving the user experience.

The above-mentioned embodiments of the present disclosure may be implemented alone or in any combination without conflict, and specifically may be set according to actual requirements, and the present disclosure is not limited thereto.

Any of the method for determining the points of interest for a user provided by the embodiments of the present disclosure may be performed by any suitable device having data processing capabilities, including, but not limited to: terminal device and servers, etc. Or any of the method for determining the point of interest for a user provided by the embodiment of the present disclosure may be executed by a processor, such as the processor executing any of the method for determining point of interest for a user mentioned by the embodiment of the present disclosure by calling a corresponding instruction stored in a memory. No more detailed description is given hereinafter.

Example Apparatus

Figure 7:
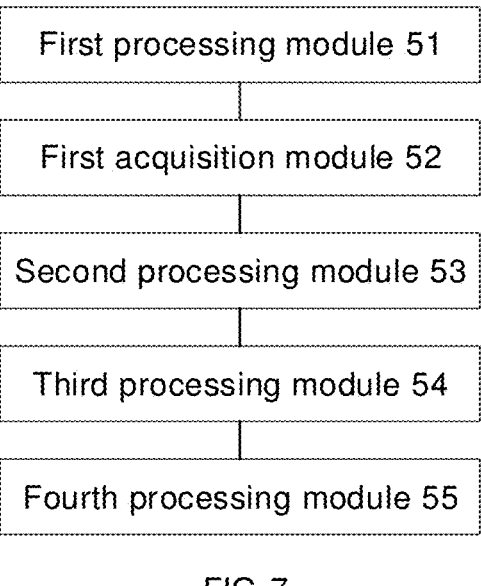
FIG. 7 is a schematic structural diagram of an apparatus for determining a point of interest for a user according to an example embodiment of the present disclosure.

FIG. 7 is a schematic structural diagram of an apparatus for determining a point of interest for a user according to an example embodiment of the present disclosure. The apparatus of the present embodiment may be used to implement a corresponding method according to the embodiment of the present disclosure, the apparatus as shown in FIG. 7 including: a first processing module 51, a first acquisition module 52, a second processing module 53, a third processing module 54 and a fourth processing module 55.

A first processing module 51 configured to, in response to receiving a point of interest query instruction of a user, determine point of interest classification information about points of interest to be queried based on the point of interest query instruction.

A first acquisition module 52 configured to acquire body state information about a user, vehicle state information about a vehicle carrying the user, and surrounding environment information about a pre-set range around the vehicle.

A second processing module 53 configured to determine a set of candidate points of interest based on the vehicle state information, the surrounding environment information and the point of interest classification information.

A third processing module 54 configured to determine scores respectively corresponding to each of the candidate points of interest in the set of candidate points of interest based on the body state information about the user, vehicle state information and a pre-set scoring rule.

A fourth processing module 55 configured to determine a target point of interest corresponding to the point of interest query instruction based on scores respectively corresponding to each of the candidate points of interest.

Figure 8:
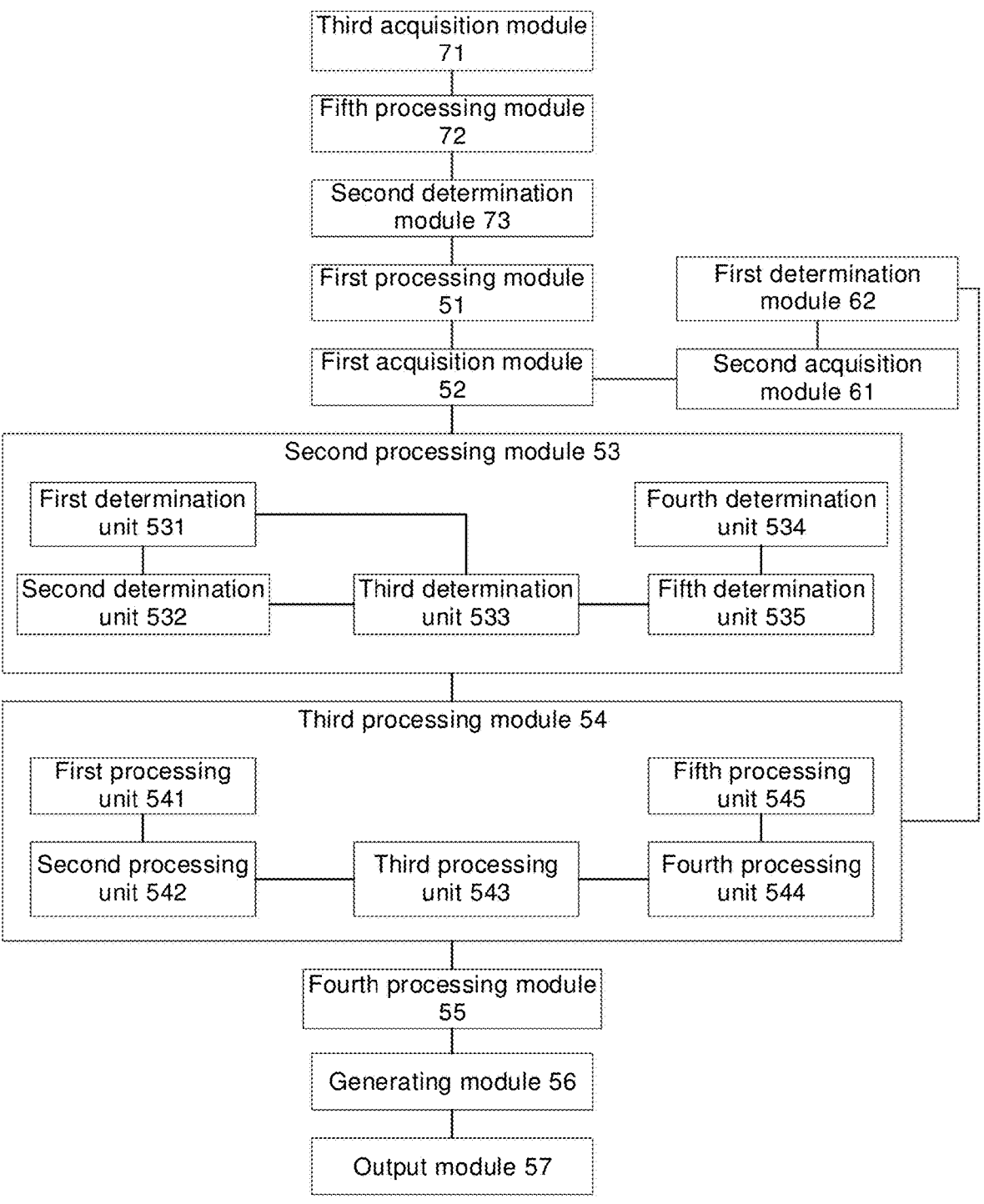
FIG. 8 is a schematic structural diagram of an apparatus for determining a point of interest for a user according to another example embodiment of the present disclosure.

FIG. 8 is a schematic structural diagram of an apparatus for determining a point of interest for a user according to another example embodiment of the present disclosure.

In some alternative embodiments, the second processing module 53 includes:

A first determination unit 531 configured to determine position information of the vehicle based on the vehicle state information.

A second determination unit 532 configured to determine road information where the vehicle is located based on the position information and the surrounding environment information.

A third determination unit 533 configured to determine a point of interest query range according to the road information.

A fourth determination unit 534 configured to determine a point of interest query type based on the point of interest classification information.

A fifth determination unit 535 configured to determine a set of candidate points of interest based on the position information, the point of interest query range and the point of interest query type.

In some alternative embodiments, the fourth determination unit 534 is specifically configured to:

in response to the point of interest classification information comprising a classification type to which the point of interest to be queried belongs, take the classification type as the point of interest query type; in response to the point of interest classification information comprising a classification type to which the point of interest to be queried belongs being not identified, take each pre-set type in a set of pre-set types as the point of interest query type.

In some alternative embodiments, the fifth determination unit 535 is specifically configured to:

generate a search parameter based on the position information, the point of interest query range and the point of interest query type; search, based on the search parameter, a pre-configured point of interest library to obtain the set of candidate points of interest.

In some alternative embodiments, the fifth determination unit 535 is specifically configured to:

generate a search parameter based on the position information, the point of interest query range and the point of interest query type; transmit the search parameter to a server so that the server searches based on the search parameter to obtain the set of candidate points of interest; and receive the set of candidate points of interest transmitted from the server.

In some alternative embodiments, the third processing module 54 includes:

A first processing unit 541 configured to determine a query start point, a query vector in a map coordinate system and a pitch angle relative to the map coordinate system of an intended direction of the user based on the position information and the body state information about the user.

A second processing unit 542 configured to determine a target included angle area range based on the query start point, the query vector and a pre-set included angle threshold.

A third processing unit 543 configured to determine a set of target candidate points of interest within the target included angle area range from the set of candidate points of interest.

A fourth processing unit 544 configured to determine a distance respectively between each of the target candidate points of interest and the query start point based on coordinate information about the query start point and each of the target candidate points of interest in the set of target candidate points of interest.

A fifth processing unit 545 configured to determine scores respectively corresponding to each of the target candidate points of interest based on the road information, the point of interest query type, coordinate information respectively corresponding to each of the target candidate points of interest, a distance respectively between each of the target candidate points of interest and the query start point, and the pitch angle.

In some alternative embodiments, the first processing unit 541 is specifically configured to:

determine at least one of a line-of-sight direction, a face orientation, a body orientation and a gesture pointing direction of a user based on position information and body state information about the user; determine a three-dimensional direction vector of the intended direction of the user under a three-dimensional reference coordinate system based on at least one of the line-of-sight direction, the face orientation, the body orientation, and the gesture pointing direction; convert the three-dimensional direction vector to a map coordinate system to obtain a query vector of the intended direction in the map coordinate system; and take an included angle between the three-dimensional direction vector and the XOY plane of the map coordinate system as the pitch angle.

In some alternative embodiments, the fourth processing unit 544 is specifically configured to:

for any one of the target candidate point of interest, determine a first state whether the target candidate point of interest includes a polygon area boundary point sequence; in response to the first state being comprising, determine a target boundary point which is closest to the query start point in a polygon area boundary point sequence of the target candidate point of interest, so as to take the distance between the target boundary point and the query start point as the distance between the target candidate point of interest and the query start point; and in response to the first state being not comprising, determine a distance between the target candidate point of interest and the query start point based on a distance between a position coordinate point included in coordinate information of the target candidate point of interest and the query start point.

In some alternative embodiments, the fifth processing unit 545 is specifically configured to:

determine model input data based on the road information, the point of interest query type, coordinate information respectively corresponding to each of the target candidate points of interest, a distance respectively between each of the target candidate points of interest and the query start point, and the pitch angle; and process the model input data using a score predictive model obtained by pre-training to obtain scores respectively corresponding to each of the target candidate points of interest.

In some alternative embodiments, the apparatus of embodiments of the present disclosure further includes:

A second acquisition module 61 configured to acquire a pupil zoom state of the user.

A first determination module 62 configured to determine an observation distance along a line-of-sight direction of the user based on the pupil zoom state.

The fifth processing unit 545 is specifically configured to:

determine scores respectively corresponding to each of the target candidate points of interest based on the road information, the point of interest query type, the coordinate information respectively corresponding to each of the target candidate points of interest, the distance respectively between each of the target candidate points of interest and the query start point, the pitch angle, and the observation distance.

In some alternative embodiments, the apparatus of embodiments of the present disclosure further includes:

A third acquisition module 71 configured to acquire voice data of the user.

A fifth processing module 72 configured to perform voice recognition on the voice data to obtain text information.

A second determination module 73 configured to determine that a point of interest query instruction of the user is received in response to the text information satisfying the point of interest query condition.

In some alternative embodiments, the apparatus of embodiments of the present disclosure further includes:

A generation module 56 configured to generate query result information corresponding to the point of interest query instruction based on the target point of interest.

An output module 57 configured to output the query result information in a pre-set manner.

Advantageous technical effects corresponding to example embodiments of the present device may be seen in the respective advantageous technical effects of the above section described above and will not be described in detail here.

Example Electronic Device

Figure 9:
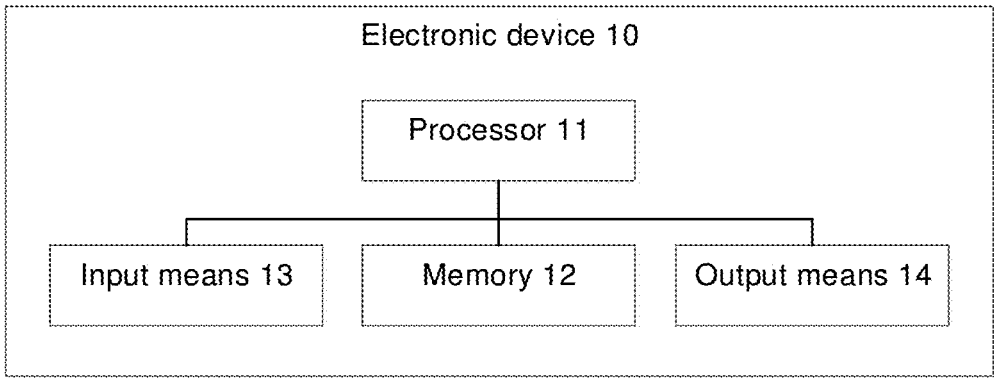
FIG. 9 is a structural diagram of an electronic device according to an embodiment of the present disclosure.

FIG. 9 is a block diagram of an electronic device including at least one processor 11 and memory 12 according to an embodiment of the present disclosure.

The processor 11 may be a central processing unit (CPU) or other form of processing unit having data processing capabilities and/or instruction execution capabilities, and may control other components in electronic device 10 to perform desired functions.

The memory 12 may include one or more computer program products, which may include various forms of computer-readable storage media, such as volatile memory and/or non-volatile memory. Volatile memory may include, for example, random access memory (RAM) and/or cache memory (cache), etc. The non-volatile memory may include, for example, a read only memory (ROM), a hard disk, a flash memory, etc. One or more computer program instructions may be stored on a computer-readable storage medium, and the processor 11 may execute one or more computer program instructions to implement the methods and/or other desired functions of the various embodiments of the present disclosure above.

In one example, the electronic device 10 may also include: an input means 13 and an output means 14, these components being interconnected via a bus system and/or other forms of connection means (not shown).

The input means 13 may also include, for example, a keyboard, a mouse, etc.

The output means 14 may output various information to the outside, including, for example, a display, speakers, a printer, and a communication network and the connected remote output means thereof, etc.

Of course, for simplicity, only some of the components of the electronic device 10 relevant to the present disclosure are shown in FIG. 9, omitting components such as buses, input/output interfaces, etc. In addition, the electronic device 10 may include any other suitable components depending on the particular application.

Example Computer Program Product and Computer Readable Storage Medium

In addition to the methods and device described above, embodiments of the present disclosure may also provide a computer program product including computer program instructions which, when executed by a processor, cause the processor to perform the steps in the methods of various embodiments of the present disclosure described in the "example method" section above.

The computer program product may include program code for performing operations of embodiments of the present disclosure written in any combination of one or more programming languages, including object-oriented programming languages, such as Java, C++, etc. and conventional procedural programming languages, such as the "C" language or similar programming languages. The program code may execute entirely on the user computing device, partially on the user device, as a stand-alone software package, partially on the user computing device, partially on a remote computing device, or entirely on the remote computing device or server.

Furthermore, embodiments of the present disclosure may also be a computer-readable storage medium having stored thereon computer program instructions which, when executed by a processor, cause the processor to perform the steps of the methods of the various embodiments of the present disclosure described in the "example method" section above.

The computer-readable storage medium may take any combination of one or more readable media. The readable medium may be a readable signal medium or a readable storage medium. A readable storage medium is exemplified by, but not limited to, a system, an apparatus, or a device including an electronic, magnetic, optical, electromagnetic, infrared, or semiconductor, or a combination of any of the foregoing. More specific examples (a non-exhaustive list) of readable storage media include: an electrical connection having one or more wires, a portable disk, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the above.

While the general principles of the present disclosure have been described above in connection with specific embodiments, the advantages, superiorities, effects, and the like set forth in the present disclosure are merely example and not limiting, and are not to be construed as necessarily referring to the various embodiments of the present disclosure. Furthermore, the particular details disclosed above are for purposes of illustration and description only and are not intended to be limiting, as the present disclosure is not limited to the particular details disclosed above.

Various modifications and alterations to the present disclosure will become apparent to a person skilled in the art without departing from the spirit and scope of the present application. Thus, it is intended that the present disclosure cover the modifications and variations of the present disclosure provided they come within the scope of the appended claims and their equivalents.

What is claimed is:

1. A method for determining a point of interest for a user, executed by an electronic device, comprising:

in response to receiving a point of interest query instruction of a user, determining point of interest classification information about points of interest to be queried based on the point of interest query instruction, wherein the point of interest classification information comprises information about whether to obtain a type to which the point of interest to be queried belongs, and a classification type in a case of obtaining the type to which the point of interest to be queried belongs;

acquiring body state information about a user, vehicle state information about a vehicle carrying the user, and surrounding environment information about a pre-set range around the vehicle, wherein the body state information comprises at least one of an orientation, a line-of-sight direction, or a gesture pointing direction; wherein the surrounding environment information comprises points of interest on both sides of a road; and wherein the vehicle state information is obtained based on sensors on the vehicle, and the body state information is obtained based on a camera in the vehicle;

determining a set of candidate points of interest based on the vehicle state information, the surrounding environment information and the point of interest classification information;

determining scores respectively corresponding to each of the candidate points of interest in the set of candidate points of interest based on the body state information about the user, vehicle state information and a pre-set scoring rule, wherein the pre-set scoring rule comprises at least one of a score predictive model with a neural network structure or a scoring mapping function taking the body state information and the vehicle state information as parameters; and determining a target point of interest corresponding to the point of interest query instruction based on scores respectively corresponding to each of the candidate points of interest;

wherein the determining scores respectively corresponding to each of the candidate points of interest in the set of candidate points of interest based on the body state information about the user, vehicle state information and a pre-set scoring rule comprises:

determining a query start point, a query vector in a map coordinate system and a pitch angle relative to the map coordinate system of an intended direction of the user based on position information of the vehicle and the body state information about the user, wherein the position information of the vehicle is determined based on the vehicle state information, wherein the pitch angle relative to the map coordinate system is an included angle between a direction vector of the intended direction of the user and the map coordinate system;

determining a target included angle area range based on the query start point, the query vector and a pre-set included angle threshold;

determining a set of target candidate points of interest within the target included angle area range from the set of candidate points of interest;

determining a distance respectively between each of the target candidate points of interest and the query start point based on coordinate information about the query start point and each of the target candidate points of interest in the set of target candidate points of interest; and determining scores respectively corresponding to each of the target candidate points of interest based on road information, a point of interest query type, coordinate information respectively corresponding to each of the target candidate points of interest, a distance respectively between each of the target candidate points of interest and the query start point, and the pitch angle, wherein the point of interest query type comprises one or more point of interest types, and is determined according to the point of interest classification information.

2. The method according to claim 1, wherein the determining a set of candidate points of interest based on the vehicle state information, the surrounding environment information and the point of interest classification information comprises:

determining the road information where the vehicle is located based on the position information and the surrounding environment information;

determining a point of interest query range based on the road information;

determining the point of interest query type based on the point of interest classification information; and determining the set of candidate points of interest based on the position information, the point of interest query range and the point of interest query type.

3. The method according to claim 1, wherein the determining a query start point, a query vector in a map coordinate system and a pitch angle relative to the map coordinate system of an intended direction of the user based on the position information and the body state information about the user comprises:

determining at least one of the line-of-sight direction, a face orientation, a body orientation, and the gesture pointing direction of the user based on the position information and the body state information about the user;

determining a three-dimensional direction vector of the intended direction of the user under a three-dimensional reference coordinate system based on at least one of the line-of-sight direction, the face orientation, the body orientation, and the gesture pointing direction;

converting the three-dimensional direction vector to the map coordinate system to obtain the query vector of the intended direction in the map coordinate system; and taking an included angle between the three-dimensional direction vector and an XOY plane of the map coordinate system as the pitch angle.

4. The method according to claim 1, wherein the determining a distance respectively between each of the target candidate points of interest and the query start point based on the query start point and coordinate information about each of the target candidate points of interest in the set of target candidate points of interest comprises:

for any one of the target candidate points of interest, determining a first state whether the target candidate point of interest comprises a polygon area boundary point sequence, wherein the polygon area boundary point sequence is an ordered sequence formed by a plurality of coordinate points on the boundary of a polygon area occupied by the candidate point of interest in the map coordinate system;

in response to the first state being comprising, determining a target boundary point which is closest to the query start point in a polygon area boundary point sequence of the target candidate point of interest, so as to take the distance between the target boundary point and the query start point as the distance between the target candidate point of interest and the query start point; and in response to the first state being not comprising, determining a distance between the target candidate point of interest and the query start point based on a distance between a position coordinate point included in coordinate information of the target candidate point of interest and the query start point.

5. The method according to claim 1, wherein the determining scores respectively corresponding to each of the target candidate points of interest based on the road information, the point of interest query type, coordinate information respectively corresponding to each of the target candidate points of interest, a distance respectively between each of the target candidate points of interest and the query start point, and the pitch angle comprises:

determining model input data based on the road information, the point of interest query type, coordinate information respectively corresponding to each of the target candidate points of interest, a distance respectively between each of the target candidate points of interest and the query start point, and the pitch angle; and processing the model input data using the score predictive model obtained by pre-training to obtain scores respectively corresponding to each of the target candidate points of interest.

6. The method according to claim 1, further comprising:

acquiring a pupil zoom state of the user based on an image containing eyes of the user;

determining an observation distance along the line-of-sight direction of the user based on the pupil zoom state;

wherein the determining scores respectively corresponding to each of the target candidate points of interest based on the road information, the point of interest query type, coordinate information respectively corresponding to each of the target candidate points of interest, a distance respectively between each of the target candidate points of interest and the query start point, and the pitch angle comprising:

determining scores respectively corresponding to each of the target candidate points of interest based on the road information, the point of interest query type, the coordinate information respectively corresponding to each of the target candidate points of interest, the distance respectively between each of the target candidate points of interest and the query start point, the pitch angle, and the observation distance.

7. The method according to claim 2, wherein the determining the point of interest query type based on the point of interest classification information comprises:

in response to the point of interest classification information comprising a classification type to which the point of interest to be queried belongs, taking the classification type as the point of interest query type; and in response to the point of interest classification information comprising a classification type to which the point of interest to be queried belongs being not identified, taking each pre-set type in a set of pre-set types as the point of interest query type.

8. The method according to claim 2, wherein the determining the set of candidate points of interest based on the position information, the point of interest query range, and the point of interest query type comprises:

generating a search parameter based on the position information, the point of interest query range and the point of interest query type;

searching, based on the search parameter, a pre-configured point of interest library to obtain the set of candidate points of interest.

9. The method according to claim 2, wherein the determining the set of candidate points of interest based on the position information, the point of interest query range, and the point of interest query type comprises:

generating a search parameter based on the position information, the point of interest query range and the point of interest query type;

transmitting the search parameter to a server so that the server searches based on the search parameter to obtain the set of candidate points of interest; and receiving the set of candidate points of interest transmitted from the server.

10. The method according to claim 1, further comprising:

acquiring voice data of the user;

performing voice recognition on the voice data to obtain text information; and in response to the text information satisfying the point of interest query condition, determining that a point of interest query instruction of the user is received.

11. The method according to claim 1, wherein after the determining a target point of interest corresponding to the point of interest query instruction based on scores respectively corresponding to each of the candidate points of interest, the method further comprises:

generating query result information corresponding to the point of interest query instruction based on the target point of interest; and outputting the query result information in a pre-set manner.

12. A non-transitory computer-readable storage medium storing a computer program thereon for executing the method for determining a point of interest for a user according to claim 1.

13. An electronic device, comprising:

a processor;

a memory for storing the processor-executable instructions;

wherein the processor is configured to read the executable instructions from the memory and execute the instructions to implement the following steps of:

in response to receiving a point of interest query instruction of a user, determining point of interest classification information about points of interest to be queried based on the point of interest query instruction, wherein the point of interest classification information comprises information about whether to obtain a type to which the point of interest to be queried belongs, and a classification type in a case of obtaining the type to which the point of interest to be queried belongs;

acquiring body state information about a user, vehicle state information about a vehicle carrying the user, and surrounding environment information about a pre-set range around the vehicle, wherein the body state information comprises at least one of an orientation, a line-of-sight direction, or a gesture pointing direction;

wherein the surrounding environment information comprises points of interest on both sides of a road; and wherein the vehicle state information is obtained based on sensors on the vehicle, and the body state information is obtained based on a camera in the vehicle;

determining a set of candidate points of interest based on the vehicle state information, the surrounding environment information and the point of interest classification information;

determining scores respectively corresponding to each of the candidate points of interest in the set of candidate points of interest based on the body state information about the user, vehicle state information and a pre-set scoring rule, wherein the pre-set scoring rule comprises at least one of a score predictive model with a neural network structure or a scoring mapping function taking the body state information and the vehicle state information as parameters; and determining a target point of interest corresponding to the point of interest query instruction based on scores respectively corresponding to each of the candidate points of interest;

wherein the determining scores respectively corresponding to each of the candidate points of interest in the set of candidate points of interest based on the body state information about the user, vehicle state information and a pre-set scoring rule comprises:

determining a query start point, a query vector in a map coordinate system and a pitch angle relative to the map coordinate system of an intended direction of the user based on position information of the vehicle and the body state information about the user, wherein the position information of the vehicle is determined based on the vehicle state information, wherein the pitch angle relative to the map coordinate system is an included angle between a direction vector of the intended direction of the user and the map coordinate system;

determining a target included angle area range based on the query start point, the query vector and a pre-set included angle threshold;

determining a set of target candidate points of interest within the target included angle area range from the set of candidate points of interest;

determining a distance respectively between each of the target candidate points of interest and the query start point based on coordinate information about the query start point and each of the target candidate points of interest in the set of target candidate points of interest; and determining scores respectively corresponding to each of the target candidate points of interest based on road information, a point of interest query type, coordinate information respectively corresponding to each of the target candidate points of interest, a distance respectively between each of the target candidate points of interest and the query start point, and the pitch angle, wherein the point of interest query type comprises one or more point of interest types, and is determined according to the point of interest classification information.

14. The electronic device according to claim 13, wherein the determining a set of candidate points of interest based on the vehicle state information, the surrounding environment information and the point of interest classification information comprises:

determining the road information where the vehicle is located based on the position information and the surrounding environment information;

determining a point of interest query range based on the road information;

determining the point of interest query type based on the point of interest classification information; and determining the set of candidate points of interest based on the position information, the point of interest query range and the point of interest query type.

15. The electronic device according to claim 13, wherein the determining a query start point, a query vector in a map coordinate system and a pitch angle relative to the map coordinate system of an intended direction of the user based on the position information and the body state information about the user comprises:

determining at least one of the line-of-sight direction, a face orientation, a body orientation, and the gesture pointing direction of the user based on the position information and the body state information about the user;

determining a three-dimensional direction vector of the intended direction of the user under a three-dimensional reference coordinate system based on at least one of the line-of-sight direction, the face orientation, the body orientation, and the gesture pointing direction;

converting the three-dimensional direction vector to the map coordinate system to obtain the query vector of the intended direction in the map coordinate system; and taking an included angle between the three-dimensional direction vector and an XOY plane of the map coordinate system as the pitch angle.

16. The electronic device according to claim 13, wherein the determining a distance respectively between each of the target candidate points of interest and the query start point based on the query start point and coordinate information about each of the target candidate points of interest in the set of target candidate points of interest comprises:

for any one of the target candidate points of interest, determining a first state whether the target candidate point of interest comprises a polygon area boundary point sequence, wherein the polygon area boundary point sequence is an ordered sequence formed by a plurality of coordinate points on the boundary of a polygon area occupied by the candidate point of interest in the map coordinate system;

in response to the first state being comprising, determining a target boundary point which is closest to the query start point in a polygon area boundary point sequence of the target candidate point of interest, so as to take the distance between the target boundary point and the query start point as the distance between the target candidate point of interest and the query start point; and in response to the first state being not comprising, determining a distance between the target candidate point of interest and the query start point based on a distance between a position coordinate point included in coordinate information of the target candidate point of interest and the query start point.

17. The electronic device according to claim 13, wherein the determining scores respectively corresponding to each of the target candidate points of interest based on the road information, the point of interest query type, coordinate information respectively corresponding to each of the target candidate points of interest, a distance respectively between each of the target candidate points of interest and the query start point, and the pitch angle comprises:

determining model input data based on the road information, the point of interest query type, coordinate information respectively corresponding to each of the target candidate points of interest, a distance respectively between each of the target candidate points of interest and the query start point, and the pitch angle; and processing the model input data using the score predictive model obtained by pre-training to obtain scores respectively corresponding to each of the target candidate points of interest.

18. The electronic device according to claim 13, wherein the processor is configured to read the executable instructions from the memory and execute the instructions to implement the further step of:

acquiring a pupil zoom state of the user based on an image containing eyes of the user;

determining an observation distance along the line-of-sight direction of the user based on the pupil zoom state;

wherein the determining scores respectively corresponding to each of the target candidate points of interest based on the road information, the point of interest query type, coordinate information respectively corresponding to each of the target candidate points of interest, a distance respectively between each of the target candidate points of interest and the query start point, and the pitch angle comprising:

determining scores respectively corresponding to each of the target candidate points of interest based on the road information, the point of interest query type, the coordinate information respectively corresponding to each of the target candidate points of interest, the distance respectively between each of the target candidate points of interest and the query start point, the pitch angle, and the observation distance.

* * * * *